United States Patent [19]
Lee

[11] Patent Number: 5,855,437
[45] Date of Patent: Jan. 5, 1999

[54] CONICAL BEARING APPARATUS HAVING A DYNAMIC PRESSURE GENERATING GROOVE

[75] Inventor: Chang-woo Lee, Kyonggi-do, Rep. of Korea

[73] Assignee: Samsung Electronics Co., Ltd., Kyungki-Do, Rep. of Korea

[21] Appl. No.: 960,434

[22] Filed: Oct. 29, 1997

[30] Foreign Application Priority Data

Oct. 29, 1996 [KR] Rep. of Korea .................. 1996 49782

[51] Int. Cl.[6] ...................................... F16C 17/10
[52] U.S. Cl. ............................................ 384/110; 384/112
[58] Field of Search ................................... 384/110, 123, 384/107, 112, 109

[56] References Cited

U.S. PATENT DOCUMENTS 4,043,612  8/1977  Orcutt ...................................... 384/110
4,828,403  5/1989  Schwartzman .......................... 384/100
4,919,547  4/1990  Schwartzman .......................... 384/110

*Primary Examiner*—Lenard A. Footland
*Attorney, Agent, or Firm*—Sughrue, Mion, Zinn, Macpeak & Seas, PLLC

[57] ABSTRACT

A conical bearing apparatus having a dynamic pressure generating groove on the upper section of a conical bearing in order to increase a fluid pressure generated by the other dynamic pressure generating groove formed on the tapered surface of the conical bearing. As fluid generated by the two dynamic pressure generating grooves is completely used for raising the body of rotation, it is possible to raise the body of rotation in a short time. Accordingly, the friction between an optical polygon support and the upper section of the conical bearing is minimized and an abrasion of the optical polygon support or the conical bearing can be reduced. Furthermore, by reducing the overload of the conical bearing and optical polygon support, the stability in rotating the optical polygon is enhanced.

3 Claims, 3 Drawing Sheets

CONICAL BEARING APPARATUS HAVING A DYNAMIC PRESSURE GENERATING GROOVE

BACKGROUND OF THE INVENTION

1. Field of the Invention

The present invention relates to a conical bearing apparatus. More particularly, the present invention relates to a conical bearing apparatus having a dynamic pressure generating groove on the upper section of a conical bearing in order to increase a fluid pressure generated by the other dynamic pressure generating groove formed on the tapered surface of the conical bearing.

2. Description of the Related Art

Recently, as the computer-related industries have developed, driving motors for various kinds of devices, such as an optical polygon driving apparatus of a laser printer, a spindle motor of a hard disk, or a head driving motor of a VCR, are required to have high accuracy and superhigh rotation performance without any trembling or vibration of the axis of the apparatus. In response to the demand to eliminate the trembling and vibration of the axis which degenerates the performance of the devices, driving motors capable of being stably rotated at a high speed have been developed, and moreover, a fluid bearing apparatus which rotates the axis of rotation of the driving motor precisely and speedily has been developed.

The above-described fluid bearing apparatus has dynamic pressure generating grooves which generate the dynamic pressure. Dynamic pressure generating grooves are mainly used as follows: a dynamic pressure generating groove having a spiral shape in a thrust bearing for supporting a thrust load; and a dynamic pressure generating groove having a herringbone shape in a radial bearing for supporting a radial load.

Generally, the conical bearing apparatus, which is used in an optical polygon driving apparatus of a laser printer, includes a conical bearing fixed at one end of the axle of fixation; and a bush formed apart from the conical bearing at a predetermined distance for receiving the conical bearing. Accordingly, the optical polygon support connected to the bush faces the upper section of the cone. Moreover, on the tapered side of the cone, a dynamic pressure generating groove is formed. When the bush which is connected to the optical polygon support starts to rotate, fluid flows into the dynamic pressure generating groove of the cone which is facing the conical groove of the bush, thereby generating a dynamic pressure. This dynamic pressure influences the optical polygon support facing the upper section of the cone, and enables the body of rotation to be risen.

In order to minimize the time when the fluid pressure generated by the dynamic pressure generating groove is more than the weights of the bush, optical polygon and optical polygon support, it is necessary to properly design the number and the area of the dynamic pressure generating grooves. However, in the conventional conical bearing apparatus, forming the dynamic pressure generating groove only on the tapered side of the cone is insufficient.

Accordingly, as it takes a long time for the body of rotation, such as the bush, to rise from the cone, an excessive friction between the conical bearing and the body of rotation is generated, thereby causing instability in rotating the axis.

SUMMARY OF THE INVENTION

Therefore, it is an object of the present invention to provide a conical bearing apparatus capable of preventing a friction between a conical bearing and a body of rotation by increasing the fluid pressure generated by dynamic pressure generating grooves and decreasing the rising time of the body of rotation.

According to the present invention, the conical bearing apparatus, includes: an axle of fixation having one end fixed to a lower bearing bracket; a conical bearing connected to the other end of the axle of fixation; and a bush having a conical groove for receiving the conical bearing, and a through hole which is extended to the conical groove and to which the axle of fixation is slidably inserted. The conical bearing includes: a first dynamic pressure generating groove formed at its outer surface; and a second dynamic pressure generating groove formed at its upper section.

Selectively, the second dynamic pressure generating groove has a spiral shape or a herringbone shape.

According to another aspect of the present invention, an optical polygon driving apparatus for a laser printer, includes: an axle of fixation having one end fixed to a lower bearing bracket; a conical bearing connected to the other end of the axle of fixation; a bush having a conical groove for receiving the conical bearing, and a through hole which is extended to the conical groove and to which the axle of fixation is slidably inserted; an optical polygon support connected to one end of the bush and facing the upper section of the conical bearing with a predetermined distance; an optical polygon connected to the optical polygon support; a plate connected to the other end of the bush and having a rotor; and an upper bearing bracket connected to the lower bearing bracket. The conical bearing includes: a first dynamic pressure generating groove formed at its outer surface; and a second dynamic pressure generating groove formed on the optical polygon support facing the upper section of the conical bearing.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the attached drawings.

Figure 1:
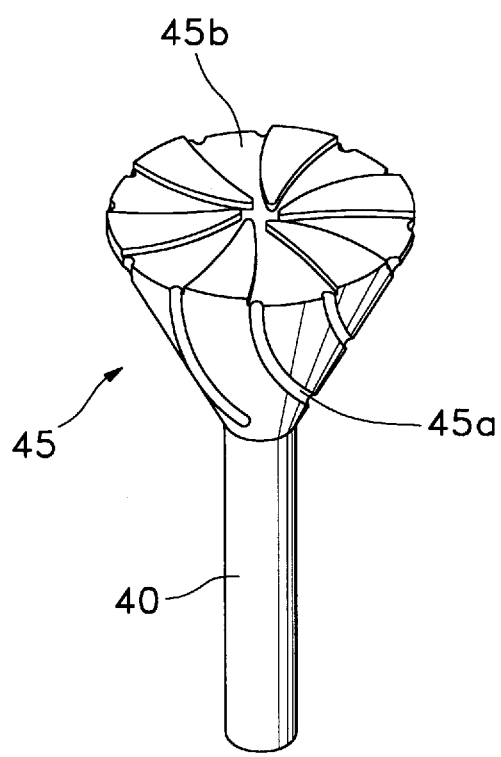
FIG. 1 is a perspective view of a conical bearing according to the present invention.
Figure 2:
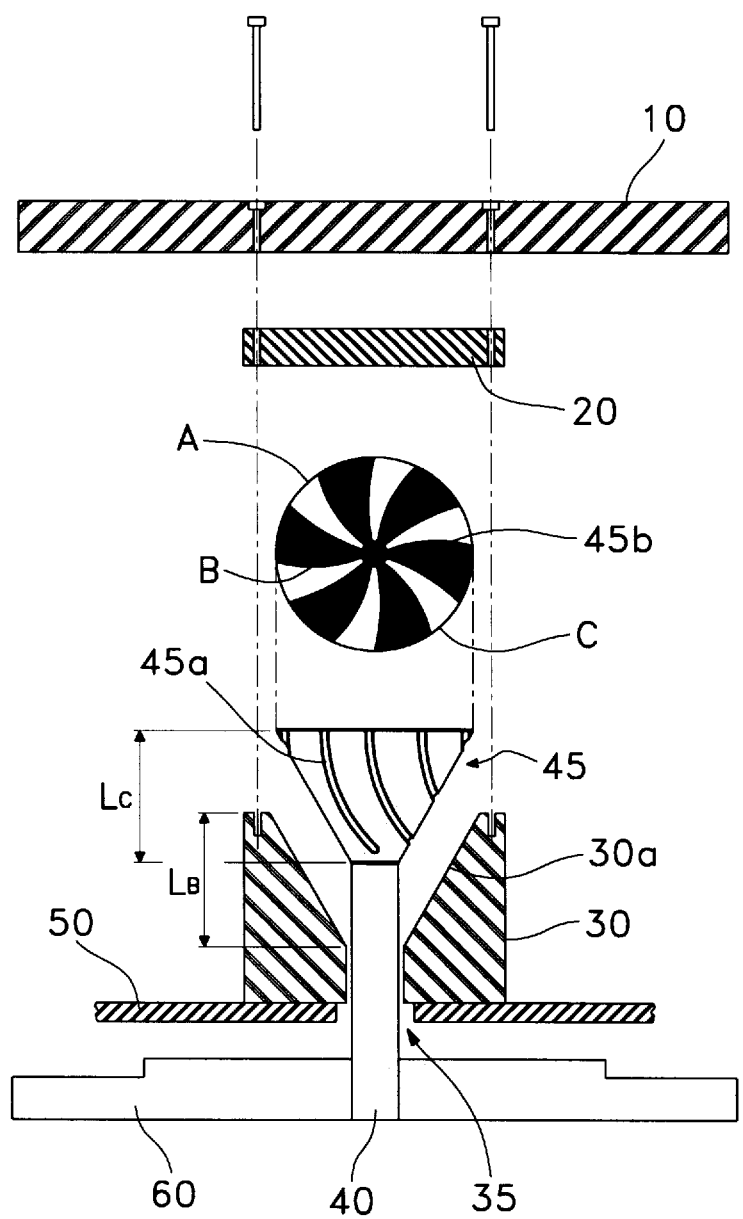
FIG. 2 is a sectional view of an optical polygon driving apparatus of a laser printer employing a conical bearing apparatus according to the present invention.

Referring to FIGS. 1 and 2, a fluid bearing apparatus will be explained.

FIG. 1 is a perspective view showing a cone of a conical bearing apparatus according to the present invention. As shown in the drawing, the conical bearing 45 has a taper shape. One end having a smaller diameter is connected to an axis or axle of fixation 40, externally, and a second end has an upended taper shape. A first dynamic pressure generating groove 45a is formed at a tapered surface, and a second dynamic pressure generating groove 45b is formed on the upper section of the conical bearing 45. Preferably, the first and second dynamic pressure generating grooves each have a spiral shape.

Referring to FIG. 2, the width of the second dynamic pressure generating groove 45b gradually becomes narrow starting from edge parts A and C of the upper section of the conical bearing to the central section B. The number of the second dynamic pressure generating grooves 45b can be at least two, and preferably five or six at a predetermined interval. The second dynamic pressure generating groove 45b can be formed by etching, or it can be formed by forming metal layers on the remaining parts excluding the parts where the second dynamic pressure generating groove 45b will be formed.

The optical polygon driving apparatus of a laser printer employing the conical bearing apparatus according to the present invention is described, referring to FIG. 2.

An optical polygon driving apparatus for a laser printer, includes: an axle of fixation 40 having one end fixed to a lower bearing bracket 60; a conical bearing 45 connected to the other end of the axle of fixation 40; a bush 30 having a conical groove 30a for receiving the conical bearing 45, and a through hole 35 which is extended to the conical groove 30a and to which the axle of fixation 40 is slidably inserted; an optical polygon support 20 connected to one end of the bush 30 and facing the upper section of the conical bearing 45 with a predetermined distance; an optical polygon 10 connected to the optical polygon support 20; a plate 50 connected to the other end of the bush 30 and having a rotor (not illustrated); and an upper bearing bracket (not illustrated) connected to the lower bearing bracket 60.

According to one aspect of the present invention, the conical bearing 45, includes: the first dynamic pressure generating groove 45a formed at the outer surface of the conical bearing 45; and the second dynamic pressure generating groove 45b formed at the upper section of the conical bearing 45.

According to another aspect of the present invention, the first dynamic pressure generating groove 45a is formed at the outer surface of the conical bearing 45; and the second dynamic pressure generating groove 45b is formed on the optical polygon support 20 facing the upper section of the conical bearing 45.

The details of the optical polygon driving apparatus are described as follows. The optical polygon 10 reflect a laser beam on an organic photoconductive drum, and it is polygonally processed with a material having a high reflectability in order to reflect the laser beam. The optical polygon support 20 having a predetermined diameter is provided at the center of the optical polygon 10, and the optical polygon 10 is attachably/detachably connected to the upper end of the bush 30 by screws.

Furthermore, the axle of fixation 40 connected to the conical bearing 45 is slidably inserted into the through hole 35 of the bush 30, and the outer surface of the conical bearing 45 and the conical groove 30a of the bush 30 are facing each other. When the conical bearing 45 and the bushing 30 are facing each other, as the height of the vertical section $L_B$ of the conical groove 30a of the bush 30 is larger than that of the vertical section $L_C$ of the conical bearing 45, a gap is formed between the upper section of the conical bearing 45 and the optical polygon support 20.

The plate 50 is attached to the lower part of the bush 30. A rotor (not illustrated) is provided at the edge of the plate 50, and a stator (not illustrated) is also provided at the lower bearing bracket 60 facing the rotor. As the above-mentioned structure is well-known technology in the optical polygon driving apparatus, the detailed description will be omitted.

In FIG. 2, the dotted sections indicate portions to be fixed, and cross-hatched sections indicate portions to be rotated, with the rotation of the plate 50.

The operation of the conical bearing according to the present invention having the above-described structure will be explained, referring to the attached drawings.

First, when power is supplied to the rotor and the stator, the plate 50 starts to drive. As the plate 50 is attached to the bush 30, the optical polygon support 20 and the optical polygon 10 (hereinafter, they are referred to as a body of rotation), are simultaneously rotated with the rotation of the plate 50.

At this time, as fluid flows into the first dynamic pressure generating groove 45a formed at the tapered side of the conical bearing 45 which is fixed at the upper section of the conical bearing 45, the fluid pressure for raising the body of rotation upwardly is generated. After that, the fluid in the upper section of the conical bearing 45 with a predetermined pressure flows into the edge sections A and C of the second dynamic pressure generating groove 45b and is rotated, and then the fluid flows into the central part B of the upper section of the conical bearing 45. Thus, the fluid pressure generated by the first dynamic pressure generating groove 45a is increased by the second pressure generating groove 45b. The second dynamic pressure generating groove 45b raises the optical polygon support 20 upwardly with an increased fluid pressure, as the area of the groove is reduced from A to B or from C to B.

As shown above, since the fluid pressure is generated by both the first and second dynamic pressure generating grooves 45a and 45b, it is possible to raise the body of rotation in a short time. Moreover, as the friction between the optical polygon support 20 and the upper section of the conical bearing 45 is minimized, an abrasion of the optical polygon support 20 or the conical bearing 45 can be reduced.

After that, as the rotational speed of the plate 50 increases, the fluid pressure caused by the first and second dynamic pressure generating grooves 45a and 45b also gradually increases in compliance with the rotational speed. When the fluid pressure is balanced with the weight of the body of rotation, the plate 50 is stably rotated without being touched.

Figure 3:
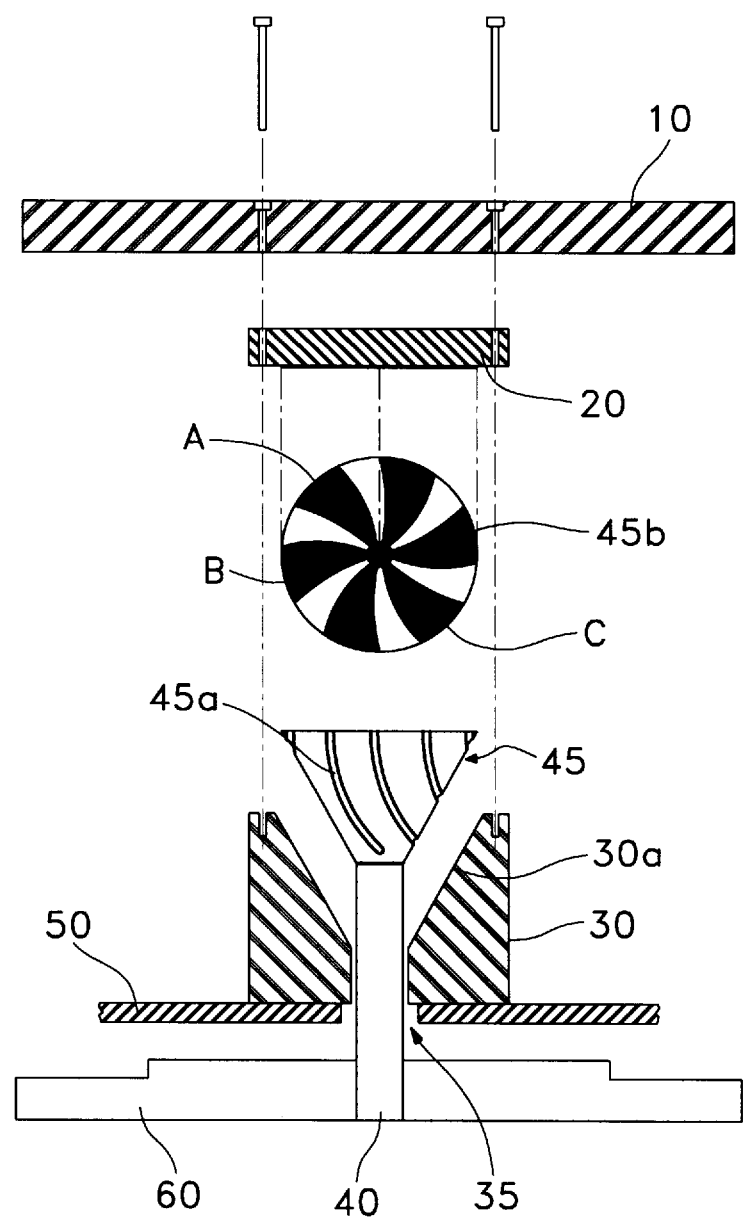
FIG. 3 is a sectional view illustrating another embodiment of the present invention.

FIG. 3 is a sectional view illustrating another embodiment of the present invention. As shown in the drawing, an optical polygon driving apparatus for a laser printer, includes: an axle of fixation 40 having one end fixed to a lower bearing bracket 60; a conical bearing 45 connected to the other end of the axle fixation 40; a bush 30 having a conical groove 30a for receiving the conical bearing 45, and a through hole 35 which is extended to the conical groove 30a and to which the axle of fixation 40 is slidably inserted; an optical polygon support 20 connected to one end of the bush 30 and facing the upper section of the conical bearing 45 with a predetermined distance; an optical polygon 10 connected to the optical polygon support 20; a plate 50 connected to the other end of the bush 30 and having a rotor (not illustrated); and an upper bearing bracket (not illustrated) connected to the lower bearing bracket 60. Moreover, a first dynamic pressure generating groove 45a is formed at the outer surface of the conical bearing 45 and a second dynamic pressure generating groove 45b is formed on the optical polygon support 20 facing the upper section of the conical bearing 45.

In this embodiment the second dynamic pressure generating groove 45b is formed on the optical polygon support 20, which has the same effect as the first embodiment. In this case, the dynamic pressure generating groove is formed on the optical polygon support 20 in the opposite direction of the groove of the first embodiment.

As described above, since the fluid pressure is generated by both the first and second dynamic pressure generating grooves, it is possible to raise the body of rotation in a short time. As the friction between the optical polygon support and the upper section of the conical bearing is minimized, an abrasion of the optical polygon support or the conical bearing can be reduced. Furthermore, by reducing the overload of the conical bearing and optical polygon support, the stability in rotating the optical polygon is enhanced.

While the above description illustrates and describes what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A conical bearing apparatus, comprising:

an axle of fixation having one end fixed to a lower bearing bracket;

a conical bearing connected to the other end of said axle of fixation; and a bush having a conical groove for receiving said conical bearing, and a through hole extending longitudinally through said conical groove and into which said axle of fixation is slidably inserted, wherein said conical bearing includes a first dynamic pressure generating groove formed on an outer surface thereon; and a second dynamic pressure generating groove formed in an upper section thereon.

2. The apparatus of claim 1, wherein said second dynamic pressure generating groove has a spiral shape.

3. The apparatus of claim 1, wherein said first dynamic pressure generating groove has a herringbone shape.

* * * * *